United States Patent
Cava et al.

[11] Patent Number: 5,993,947
[45] Date of Patent: Nov. 30, 1999

[54] LOW TEMPERATURE COEFFICIENT DIELECTRIC MATERIAL COMPRISING BINARY CALCIUM NIOBATE AND CALCIUM TANTALATE OXIDES

[75] Inventors: Robert Joseph Cava, Princeton; James Joseph Krajewski, Raritan, both of N.J.

[73] Assignee: Lucent Technologies Inc., Murray Hill, N.J.

[21] Appl. No.: 08/971,422

[22] Filed: Nov. 17, 1997

[51] Int. Cl.⁶ .................................................. B23B 15/00
[52] U.S. Cl. ..................... 428/210; 174/258; 174/138 C; 501/135
[58] Field of Search ............................. 174/125.1, 126.1, 174/126.2, 126.4, 138 C, 258; 428/210; 501/135

[56] References Cited

U.S. PATENT DOCUMENTS

| | | | |
|---|---|---|---|
| 4,131,479 | 12/1978 | Ichinose et al. | 501/135 |
| 4,542,083 | 9/1985 | Cava et al. | 429/218 |
| 4,675,302 | 6/1987 | Roy et al. | 501/135 |
| 5,183,799 | 2/1993 | Ogushi et al. | 501/135 |
| 5,663,528 | 9/1997 | Tanaka et al. | 174/125.1 |
| 5,827,801 | 10/1998 | Tanaka et al. | 505/230 |

OTHER PUBLICATIONS

Cava et al., "Low Temperature Coefficient Bulk Dielectrics in the $Ca_2Nb_2O_7$—$Ca_2Ta_2O_7$ System", Materials Research Bulletin, vol. 33, No. 4, pp. 527–532, 1998.

*Primary Examiner*—Deborah Jones
*Assistant Examiner*—Cathy F. Lam

[57] ABSTRACT

Dielectric materials comprising $Ca_2Ta_{2-x}Nb_xO_7$ have high dielectric constants (Ks) and relatively low temperature coefficients of dielectric constants (TCKs). Preferably, in this composition $0.20 \leq x \leq 1.20$ and more preferably $0.32 \leq x \leq 0.40$, and particularly preferred is the composite where x is 0.36. With a preferred embodiment where x is about 0.36, the dielectric constant is near 30 and the TCK is about 2 ppm/°C., and the Q of the polycrystalline ceramic at 1 MHz is approximately 5000. The dielectric materials are particularly useful in microwave communications applications

14 Claims, 3 Drawing Sheets

LOW TEMPERATURE COEFFICIENT DIELECTRIC MATERIAL COMPRISING BINARY CALCIUM NIOBATE AND CALCIUM TANTALATE OXIDES

FIELD OF THE INVENTION

The invention relates to dielectric materials having high dielectric constants (Ks) and relatively low temperature coefficients of dielectric constants (TCKs) and, in particular, to dielectric materials comprising a binary system of $Ca_2Ta_2O_7$ and $Ca_2Nb_2O_7$. The invention is particularly useful in microwave communications applications.

BACKGROUND OF THE INVENTION

Materials having high dielectric constants and low temperature coefficient of dielectric constants (TCKs) are advantageous particularly in systems where it is necessary to have circuits with high thermal stability, such as in resonators and filters of microwave communication systems. Bulk ceramics comprising $Ba_2Ti_9O_{20}$, $Ba_{6-3x}Ln_{8+2x}Ti_{18}O_{54}$, and $Zr(Ti_{1-x}Sn_x)O_4$ are currently in use for macroscopic dielectric components employed in microwave communications devices, as disclosed in H. M. O'Bryan, J. Thomson and J. K. Plourde, J. Am. Ceram., Soc. 57 450 (1974); T. Negas, G, Yeager, S. Bell and N. Coats, Am. Ceram. Soc. Bull. 72 80 (1993); S. Nishigaki, H. Kato, S. Yano, and R. Kamimura, Ceramic Bulletin 66 1405 (1987); T. Negas and P. Davies, in "Materials and Processes for Wireless Communications," Ceramic Transactions, 53 (1993); and R. Christoffersen, P. K. Davies and X, Wei, J. Am. Ceram. Soc. 77 1441 (1994). A dielectric material for use in a microwave resonator comprising barium oxide and titanium dioxide as the primary components is disclosed in U.S. Pat. No. 5,332,984 issued to Abe, et als., on Jul. 26, 1994, entitled "Dielectric Resonator or Filter for Microwave Application, and Method of Producing the Dielectric Resonator or Filter," which is hereby incorporated by reference.

These materials ($Ba_2Ti_9O_{20}$, $Ba_{6-3x}Ln_{8+2x}Ti_{18}O_{54}$, and $Zr(Ti_{1-x}Sn_x)O_4$) reportedly exibit dielectric constants (K) of approximately 30–90, and temperature coefficients of dielectric constant (TCKs) of about 0–20 ppm/°C. or more. The property of a low TCK has been found, however, for only few ceramic materials with dielectric constants above 25. In this area of technology, there is thus a need to provide a selection or choice of materials having low TCKs and high dielectric constants and materials potentially having superior properties. This invention addresses these needs. Further advantages may appear more fully upon consideration of the detailed description given below.

SUMMARY OF THE INVENTION

Applicants have discovered that bulk polycrystalline ceramics in the binary $Ca_2Ta_2O_7$—$Ca_2Nb_2O_7$ system have useful dielectric properties in that they exhibit a relatively high dielectric constant and low temperature coefficient of dielectric constant (TCK). The binary system comprises $Ca_2Ta_{2-x}Nb_xO_7$, preferably where $0.20 \leq x \leq 1.20$, more preferably where $0.32 \leq x \leq 0.40$, and particularly preferred is the composite where $x \approx 0.36$. With a preferred embodiment where x is about 0.36, the dielectric constant is near 30 and the TCK is about 2 ppm/°C., and the Q of the polycrystalline ceramic at 1 MHz is approximately 5000.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention without limiting the scope thereof.

DETAILED DESCRIPTION OF THE INVENTION

The dielectric material according to this invention is comprised of a binary composite of $Ca_2Ta_2O_7$ and $Ca_2Nb_2O_7$. Pure materials comprised of $Ca_2Ta_2O_7$ and $Ca_2Nb_2O_7$ exibit dielectric constants of about 25 but also large positive and negative TCKs, respectively. In particular, the $Ca_2Ta_2O_7$ material exhibits a TCK of about −450 ppm/°C., and the $Ca_2Nb_2O_7$ material exhibits a TCK of about +250 ppm/°C. Applicants have discovered that binary systems comprising a mixture of these materials and, in particular, comprising $Ca_2Ta_{2-x}Nb_xO_7$, exhibit a relatively high dielectric constant and low TCK. Preferably, $0.20 \leq x \leq 1.20$ and more preferably $0.32 \leq x \leq 0.40$, and particularly preferred is the composite where x is about 0.36. The discussion below is divided into three parts. First, in Part. A, an application of this invention is described with reference to use of the dielectric material in a microwave filter. Second, in Part B, a method for preparing the dielectric materials is described. Third and lastly, in Part C, properties and preferred composites of the dielectric material are described.

A. APPLICATION EXAMPLE

Figure 1:
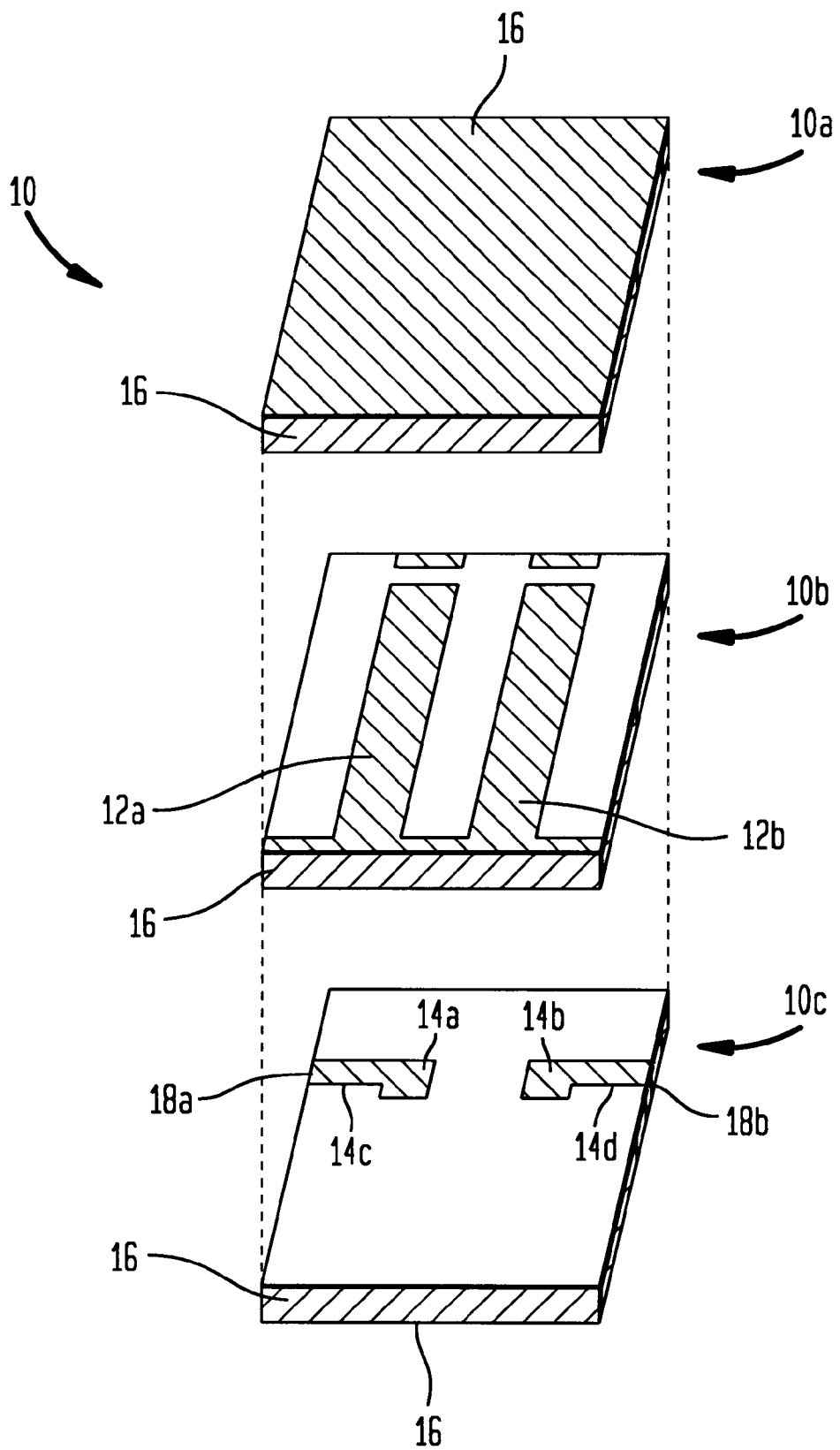
FIG. 1 is a schematic illustration of a microwave filter in which the inventive dielectric material may be used.

Referring to FIG. 1, there is shown a perspective view of a filter for use in a microwave communications systems of the stripline type. The filter comprises a dielectric substrate 10 having three layers 10a, 10b, and 10c, wherein each structure is comprised of the inventive dielectric materials. Electrodes are incorporated into the layers of the substrate 10, including a pair of resonator electrodes 12a, 12b, disposed on the intermediate layer 10b, and coupling electrodes 14a, 14b, disposed on the bottom or end layer 10c. An earth electrode 16 covers substantially the entire outer circumference of the dielectric substrate 10. The coupling electrodes 14a, 14b, are connected by extensions 14c, 14d, to input and output contacts 18a, 18b.

By way of illustration, therefore, FIG. 1 shows an exemplary microwave filter in which the dielectric material of this invention may be incorporated; however, it is to be understood the invention is not limited to use with the filter shown. For example, the dielectric material may be used in bulk-type resonators or in other applications besides microwave communications systems.

B. MATERIAL PREPARATION

The inventive composite may be fabricated from starting materials comprising fine powders of $CaCO_3$ (99.94%) $Nb_2O_5$ (99.9%) and $Ta_2O_5$ (99–98%). The following method was used to prepare the dielectric material from these starting materials and particularly for the thirteen members of the series reported in Table 1, below, within the range where x of $Ca_2Ta_{2-x}Nb_xO_7$ is from 0.00 to 2.00.

Depending on the value for x, the proportion of starting materials was changed, i.e., with larger amounts of $Nb_2O_5$ for higher values of x and larger amounts of $Ta_2O_5$ for lower values of x. After mixing in the appropriate proportion, the powders were mechanically ground and fired in $Al_2O_3$ crucibles for 16 hours at 1350° C. in air. The powders were then ground in a ball mill (using zirconia balls) for 4 hours, filtered, dried, and pressed into disks about ½ inch in diameter and 0.125 inches in thickness. These disks were then fired in air for 2 to 3 hours at temperatures ranging from 1550 to 1425° C., with the firing time and temperature variable with different values for x. The conditions for each composition are recorded in Table 1, below. As can be seen, higher firing temperatures were used (as necessitated for densification) for compositions involving lower values for x and thus higher percentages of tantalum. The firing temperature did not significantly affect the dielectric properties of the ceramics except in a way that was consistent with the relative densities of the materials.

The surfaces of the disks were sand smoothed, and electrical contact was made to the polycrystalline ceramic disks by applying 1:1 mole ratio Ga:In alloy solder electrodes. The materials were characterized by conventional powder X-ray diffraction.

C. PROPERTIES AND PREFERRED COMPOSITES

Dielectric constants and dissipation factors (D=1/Q=tan δ) for each of the composites prepared in accordance with the method described above in Part B were measured between 100 KHz and 10 MHz with a commercial impedance meter (Hewlett-Packard model 4192A) at an applied signal of approximately 3 V/cm. Also, using a commercial variable temperature chamber, variable temperatures between 0 and 100° C. were achieved, and the dielectric constants of the various composites were measured for 0, 20, 40, 60, 80, and 100 degrees. Tables 1 and 2 report data and results for thirteen members of the series within the range $0 \leq x \leq 2.0$. Table 1 summarizes the firing time and temperature, the dielectric constant K, dissipation factor D (=tan δ), and temperature coefficient of dielectric constant (TCK) at 20 degrees C. The TCK as reported in Table 1 was calculated based on dielectric data presented in Table 2 applying the formula $TCK=(((K_{100}-K_0)/100/K_{20})\times 10^6$, which is a good approximation to the derivative near T=20° C. due to the straight line behavior of K versus T plots.

TABLE 1

Summary of 1 MHz Dielectric Data at 20° C. for $Ca_2Ta_{2-x}Nb_xO_7$ Polycrystalline Ceramics

| x | firing temp ° C. | firing time Hr. | K | D | TCK ppm/° C. |
|---|---|---|---|---|---|
| 0.00 | 1550 | 2 | 23.53 | .0005 | −444 |
| 0.05 | 1525 | 2 | 34.91 | .0006 | −373 |
| 0.10 | 1525 | 2 | 32.03 | .0005 | −378 |
| 0.20 | 1525 | 2 | 35.71 | .0006 | −425 |
| 0.24 | 1525 | 2 | 38.27 | .0004 | −262 |
| 0.28 | 1525 | 2 | 35.61 | .0004 | −177 |
| 0.32 | 1525 | 2 | 35.00 | .0002 | −171 |
| 0.36 | 1525 | 2 | 30.13 | .0002 | <±2 |
| 0.40 | 1525 | 2 | 24.98 | .0000 | 165 |
| 0.80 | 1475 | 3 | 22.01 | .0003 | 227 |
| 1.20 | 1475 | 3 | 34.49 | .0002 | 284 |
| 1.60 | 1475 | 3 | 32.02 | .0002 | 259 |
| 2.00 | 1425 | 3 | 26.96 | .0000 | 231 |

TABLE 2

Summary of the Temperature Dependent 1 MHz Dielectric Data for $Ca_2Ta_{2-x}Nb_xO_7$ Polycrystalline Ceramics

| | Temperature, ° C. | | | | | |
|---|---|---|---|---|---|---|
| x | 0 | 20 | 40 | 60 | 80 | 100 |
| 0.00 | 23.78 | 23.53 | 23.31 | 23.10 | 22.92 | 22.73 |
| 0.05 | 35.18 | 34.91 | 34.62 | 34.35 | 34.10 | 33.88 |
| 0.10 | 32.29 | 32.03 | 31.75 | 31.52 | 31.28 | 31.08 |
| 0.20 | 36.03 | 35.71 | 35.37 | 35.07 | 34.79 | 34.52 |
| 0.24 | 38.52 | 38.27 | 38.05 | 37.85 | 37.66 | 37.52 |
| 0.28 | 35.75 | 36.61 | 35.48 | 35.33 | 35.21 | 35.12 |
| 0.32 | 35.13 | 35.00 | 34.87 | 34.75 | 34.63 | 34.53 |
| 0.36 | 30.15 | 30.13 | 30.13 | 30.14 | 30.14 | 30.14 |
| 0.40 | 24.89 | 24.99 | 25.07 | 25.15 | 25.23 | 25.31 |
| 0.80 | 21.91 | 22.01 | 22.11 | 22-22 | 22.32 | 22.41 |
| 1.20 | 34.34 | 34.50 | 34.71 | 34.92 | 35.16 | 35.32 |
| 1.60 | 31.86 | 32.02 | 32.19 | 32.36 | 32.53 | 32.69 |
| 2.00 | 26.84 | 26.96 | 27.09 | 27.22 | 27.34 | 27.47 |

The dielectric constants reported in Table 1 were found to be independent of frequency in the 100 KHz to 10 MHZ range for all materials at all temperatures studied. Small variations were noted but these were attributable to the lead wires and sample cells of the measurement circuit which caused small impedance imbalances. As can be seen from Table 1, when x was 0 (i.e., the material comprised $Ca_2Ta_2O_7$), the material exhibited a TCK of about −444 ppm/°C., and where x was 2.0 (i.e., the material comprised $Ca_2Nb_2O_7$), the material exhibited a TCK of about +231 ppm/°C. For both end members of the series (where x=0 and x=2.0), the dielectric constant was about 25. However, it was discovered that a balanced TCK and dielectric constant greater than 25 could be obtained with mixtures of the two phases. The dielectric constants in the solid solutions involving mixtures falling within the range 0. $05 \leq x \leq 1.60$ are generally enhanced over those in the pure end members, with a balanced TCK value near K=30 where x=0.36. These values imply Qs on the order of several thousand, which is in the range of other materials in common use for microwave applications.

Figure 2:
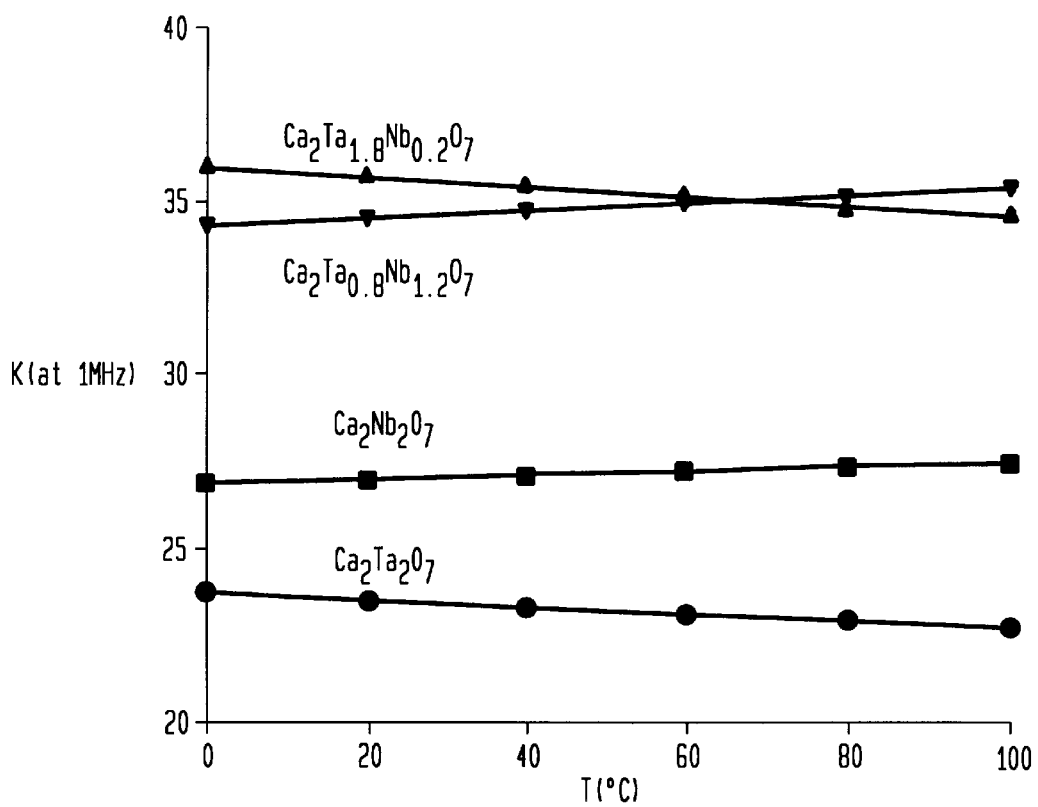
FIG. 2 is a graphical illustration of the dielectric constant measured at 1 MHz at various temperatures for two embodiments of the invention and two intermediates.

FIG. 2 plots the dielectric constant K measured at temperatures 0, 20, 60, 80, and 100° C., for the two end members where x=0 ($Ca_2Ta_2O_7$), and x=2.0 ($Ca_2Nb_2O_7$), and for two members of the series where x=0.2 ($Ca_2Ta_{1.8}Nb_{0.2}O_7$) and x=1.2 ($Ca_2Ta_{0.8}Nb_{1.2}O_7$). The dielectric constants for the mixtures are enhanced as compared with the pure end members.

Figure 3:
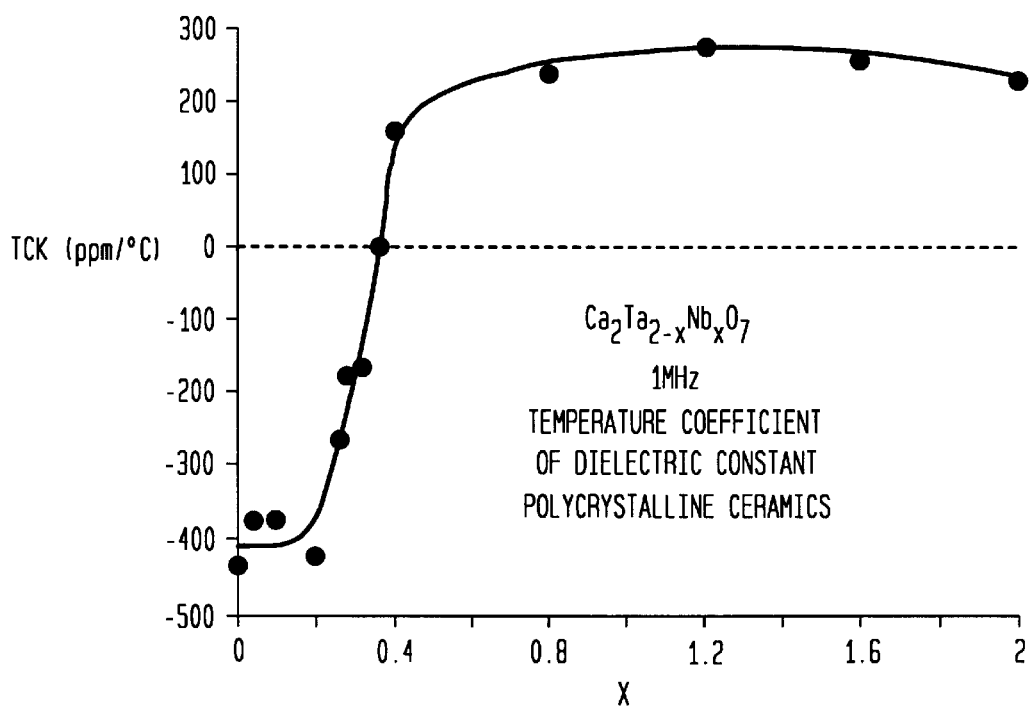
FIG. 3 is a graphical illustration of the TCK for various embodiments of the invention measured at 20° C.

FIG. 3 plots the TCKs for the thirteen members of the series as a function of x, thus illustrating the variation in TCK with composition across the series. The variation of TCK with composition is generally characteristic of a series in which a two-phase composition region is crossed between x=0.2 and x=0.4. For compositions where x is less than or equal to 0.2, the materials are of the high $Ca_2Ta_2O_7$ type, and for compositions where x is greater than 0.4, materials are of the $Ca_2Nb_2O_7$-type solid solution. In the region of TCK balance, however, the materials unexpectedly are a mixture of the high $Ca_2Ta_2O_7$ type solid solution and a new phase, as further explained below.

Figure 4:
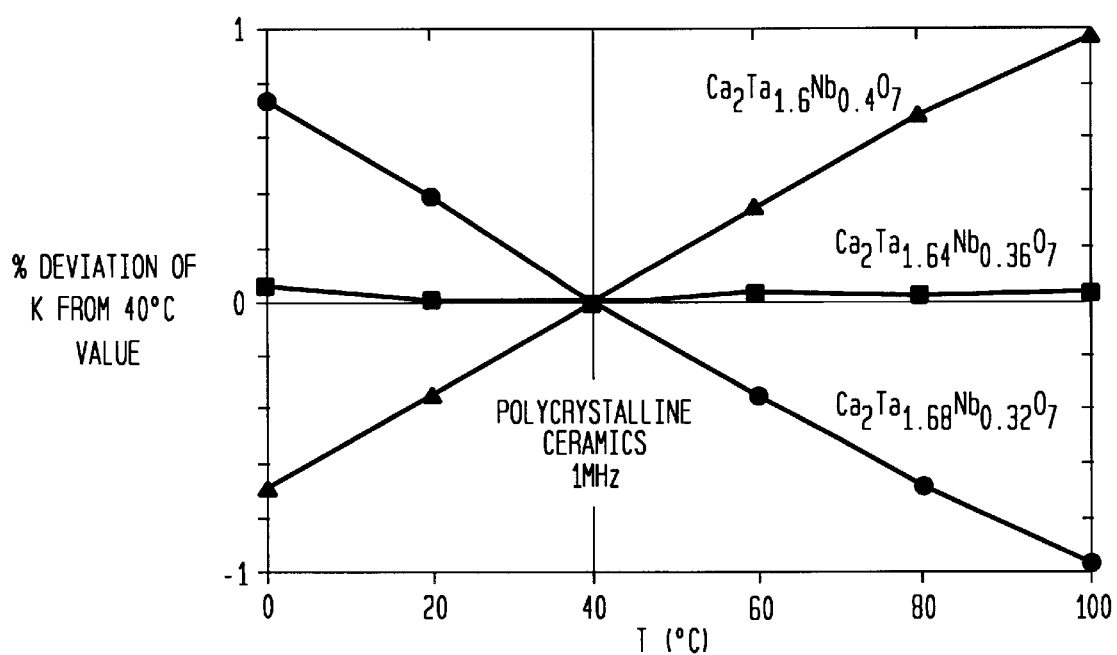
FIG. 4 is a graphical illustration of the relative change in dielectric constant plotted as a percent deviation from the 40° C. value for the three embodiments where x of $Ca_2Ta_{2-x}Nb_xO_7$ is 0.32, 0.36, and 0.40.

FIG. 4 plots the relative change in dielectric constant at 1 MHz for compositions $Ca_2Ta_{2-x}Nb_xO_7$ in the vicinity of the zero crossing of TCK. The changes in dielectric constant are plotted as percent deviations from the K value at 40 degrees C. The dielectric constants at 40° C. are 34.87, 30.13 and 25.07, for x=0.32, 0.36 and 0.40, respectively.

Characterization of the materials by conventional powder X-ray diffraction (CuK x-radiation), yielded an unexpected result, revealing the presence of a new phase having a small positive TCK in systems involving compositions between x≅0.36 and x≅0.40. For small x (up to 0.2), the materials displayed a solid solution having a structure reflecting the high temperature polymorph of $Ca_2Ta_2O_7$. At larger x (from 0.4 to 2), the materials were a solid solution reflecting a polymorph of the $Ca_2Nb_2O_7$ type. In the 0.4 sample, however, there was evidence of a small amount of a second phase, indicating that the true solubility range of the $Ca_2Nb_2O_7$ type phase was between approximately 0.5 and 2.0. The samples in the composition region between 0.2 and 0.4 are of particular interest as they span the region where the TCK changes rapidly with composition, reaching a balance point near x=0.36. In the x=0.36 sample, there was a small amount of the solid solution $Ca_2Ta_2O_7$ phase; the amount of that phase is highest at 0.2 and decreases with increasing x away from 0.20. However, the dominant phase in the 0.36 sample was not the $Ca_2Nb_2O_7$ phase, but a third phase which appeared as a minor phase in the x=0.4 sample. Thus, a new phase is present in this system between the compositions x≅0.36 and x≅0.40, the diffraction pattern of which is subtly different from the $Ca_2Nb_2O_7$ type phase present when x is between approximately 0.5 and 2.0. The balance of the (small positive) TCK of that phase with the negative TCK of the $Ca_2Ta_2O_7$ phase yields good dielectric properties in this system. Additionally, The temperature coefficient of resonant frequency (TCF) will differ from TCK due to thermal expansion, but the TCF is expected to be easily balanced out by small changes in composition near x=0.36.

It will be understood that the embodiments described herein are merely exemplary and that a person skilled in the art may make variations and modifications without departing from the spirit and scope of the invention. For example, although the invention is illustrated with regard to use in a microwave stripline filter, the inventive dielectric material may be used in other applications as well. All such variations and modifications are intended to be included within the scope of the appended claims.

We claim:

1. A material comprising a composite of $Ca_2Ta_2O_7$ and $Ca_2Nb_2O_7$ for use as a dielectric material having a dielectric constant and temperature coefficient of dielectric constant.

2. The dielectric material of claim 1, wherein when measured in bulk polycrystalline form at 20° C. and 1 MHz the dielectric constant of said material is about at least 25 and the temperature coefficient of dielectric constant of said material is less than about 20 ppm/°C.

3. A dielectric resonator for use in a microwave telecommunication system comprising the dielectric material according to claim 1.

4. A dielectric resonator according to claim 3 comprising a substrate having surfaces fabricated with the composite according to claim 1 and a plurality of conductors forming a conductor pattern on the surfaces of the substrate.

5. A dielectric resonator according to claim 3 comprising a block of dielectric material according to claim 1 coated with a metal electrode.

6. A dielectric filter for use in a microwave telecommunication system comprising a plurality of resonators according to claim 3.

7. A composite having a dielectric constant and temperature coefficient of dielectric constant for use as a dielectric material prepared by mixing powders of $CaCO_3$, $Nb_2O_5$ and $Ta_2O_5$ and firing the mixture at temperatures of above 1350 degrees Centigrade.

8. A material comprising $Ca_2Ta_{2-x}Nb_xO_7$, in which x is in the range of about 0.20 to 1.20, for use as a dielectric material having a dielectric constant and temperature coefficient of dielectric constant.

9. The dielectric material of claim 8, in which $0.32 \leq x \leq 0.40$.

10. The dielectric material of claim 9, in which x is about 0.36.

11. The dielectric material of claim 10, in which when measured in bulk polycrystalline form at 20° C. and 1 MHz the dielectric constant of said material is about at least 25 and the temperature coefficient of dielectric constant of said material is less than about 20 ppm/°C.

12. A dielectric resonator for use in a microwave telecommunication system comprising a dielectric material according to claim 11.

13. A dielectric filter for use in a microwave telecommunication system comprising a plurality of resonators according to claim 12.

14. A method of fabricating a dielectric substrate comprising $Ca_2Ta_2O_7$ and $Ca_2Nb_2O_7$ for use in a dielectric resonator or dielectric filter for microwave application, the method comprising the steps of:

mixing a first powder of $CaCO_3$, a second powder of $Nb_2O_5$ and a third powder of $Ta_2O_5$ to provide a powder mixture;

mechanically grinding the mixture; firing the mixture for more than 15 hours at temperatures above 1350 degrees Centigrade; and pressing the mixture into a disk for use as the dielectric substrate; and firing the disk for a period of 2 to 3 hours at a temperature of about 1425 to 1550 degrees Centigrade to provide the dielectric substrate comprising $Ca_2Ta_2O_7$ and $Ca_2Nb_2O_7$.

* * * * *